(12) United States Patent
Lee et al.

(10) Patent No.: US 12,276,716 B2
(45) Date of Patent: Apr. 15, 2025

(54) OBJECT INFORMATION GENERATING SYSTEM AND OPERATING METHOD THEREOF

(71) Applicant: HYUNDAI MOBIS CO., LTD., Seoul (KR)

(72) Inventors: Tae Yun Lee, Yongin-si (KR); Jin Gyu Jang, Yongin-si (KR); Tae Yoon Son, Yongin-si (KR); Duk Yun Cho, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 298 days.

(21) Appl. No.: 17/975,671

(22) Filed: Oct. 28, 2022

(65) Prior Publication Data

US 2023/0168356 A1    Jun. 1, 2023

(30) Foreign Application Priority Data

Nov. 30, 2021  (KR) .......................... 10-2021-0168475

(51) Int. Cl.
*G01S 13/06* (2006.01)
*G01S 17/88* (2006.01)

(52) U.S. Cl.
CPC .............. *G01S 13/06* (2013.01); *G01S 17/88* (2013.01)

(58) Field of Classification Search
CPC .................................. G01S 13/06; G01S 17/88
See application file for complete search history.

(56) References Cited

U.S. PATENT DOCUMENTS

2021/0397852 A1* 12/2021 Tabor ........................ G06T 7/00

FOREIGN PATENT DOCUMENTS

KR        10-2128544 B1    6/2020

* cited by examiner

*Primary Examiner* — Michael D Lang
(74) *Attorney, Agent, or Firm* — NovoTechIP International PLLC

(57) ABSTRACT

Proposed is an object information generating system including an object detector generating object information on the basis of object detection signals and a processor controlling the object detector. The processor determines an area of interest of a field of view (FOV) of the object detector and generates the object information for the area of interest with the object detector.

8 Claims, 9 Drawing Sheets

OBJECT INFORMATION GENERATING SYSTEM AND OPERATING METHOD THEREOF

CROSS-REFERENCE TO RELATED APPLICATION

This application claims priority from and the benefit of Korean Patent Application No. 10-2021-0168475, filed on Nov. 30, 2021, which is hereby incorporated by reference for all purposes as if set forth herein.

BACKGROUND

Field

Exemplary embodiments of the present disclosure relate to an object information generating system and an operating method thereof, and more particularly, to an object information generating system and an operating method thereof able to actively change the detection range of the object information generating system.

Discussion of the Background

Radio detecting and ranging (RADAR) is a detection system to measure a distance to, a direction of, and the like of an object through the emission of electromagnetic waves to the object and reception of the electromagnetic waves reflected from the object. Such an object information generating system may be provided in a moving body, such as a vehicle, to track or detect obstructions or the like present in the surroundings the moving body or in a specific space in order to track or detect an object positioned in the space.

In general, the detection range of the radar system is set in the process of designing the radar system on the basis of the purpose for which the radar system is to be used and the environment in which the radar system will be used. In such a radar system, when radar signals received by a radar antenna are processed, the radar signals received from the entire detection range are supposed to be signal-processed. Thus, there may be a problem in that data in unnecessary ranges may also be used in the signal processing, thereby increasing time and cost consumed in the signal processing.

Related art of the present disclosure is disclosed in Korean Patent 10-2128544 (published on Jun. 24, 2020), entitled "Radar Device and Signal Processing Method Used Therefor."

SUMMARY

Various embodiments are directed to an object information generating system and an operating method thereof able to actively change the detection range of the object information generating system.

According to an aspect of the present disclosure, provided is an object information generating system including: an object detector generating object information on the basis of object detection signals; and a processor controlling the object detector. The processor may determine an area of interest of a field of view (FOV) of the object detector and generates the object information for the area of interest with the object detector.

The processor may identify a blind area caused by a fixed object and determines an area of the FOV excepting the blind area to be the area of interest.

The object information generating system may further include an input module receiving environment information regarding surroundings of the object detector. The processor may identify the blind area on the basis of the environment information input using the input module.

The processor may detect the fixed object present in the FOV with the object detector and identifies the blind area on the basis of a result of the detection.

The processor may perform beam forming using the object detector so that object detection signals are only emitted to the area of interest.

The processor may not perform signal processing for generating the object information for object detection signals corresponding to an area excepting the area of interest so that only object information corresponding to the area of interest is generated.

The object detector may comprise at least one of a radar, a LiDar, and a camera.

According to another aspect of the present disclosure, provided is an operating method of an object information generating system, the method including: determining, by a processor, an area of interest of a FOV of an object detector generating object information, on the basis of object detection signals; and generating, by the processor, the object information for the area of interest with the object detector.

The determination of the area of interest may include: identifying, by the processor, a blind area caused by a fixed object; and determining an area of the FOV excepting the blind area to be an area of interest.

The operating method may further include: before the determination of the area of interest, receiving, by the processor, environment information regarding surroundings of the object detector using an input module. In the identification of the blind area, the processor may identify the blind area on the basis of the environment information input using the input module.

The identification of the blind area may include: detecting, by the processor, the fixed object present in the FOV using the object detector; and identifying the blind area on the basis of a result of the detection.

In the generation of the object information, the processor may perform beam forming using the object detector so that object detection signals are only emitted to the area of interest.

In the generation of the object information, the processor may not perform signal processing for generating the object information for object detection signals corresponding to an area excepting the area of interest so that only object information corresponding to the area of interest is generated.

The object detector may comprise at least one of a radar, a LiDar, and a camera.

According to an aspect of the present disclosure, it is possible to actively change the detection range of the object information generating system in response to the surrounding environment, thereby reducing the amount of data to be processed during signal processing of object detection signals and reducing a calculation time consumed by the signal processing of object detection signals.

DETAILED DESCRIPTION OF THE ILLUSTRATED EMBODIMENTS

Figure 1:
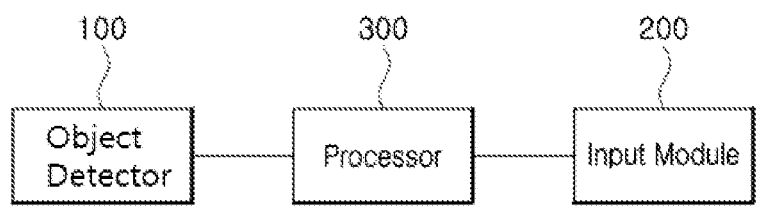
FIG. 1 is a block diagram illustrating an object information generating system according to embodiments of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an object information generating system and an operating method thereof will be described with reference to the accompanying drawings through various exemplary embodiments. In the process, thicknesses of lines shown in the drawings and sizes of constituent elements may be exaggerated for clarity and convenience. Further, the following terms are defined, considering functions thereof in the present invention, and may be varied according to intentions and customs of a user or an operator. Therefore, the terms should be defined on the basis of the contents of the entire specification.

FIG. 1 is a block diagram illustrating an object information generating system according to embodiments of the present disclosure, and FIGS. 2A, 2B, 3A, 3B, 4A and 4B are example diagrams illustrating the object information generating system according to embodiments of the present disclosure.

Referring to FIG. 1, the object information generating system according to an embodiment of the present disclosure may include an object detector 100, an input module 200, and a processor 300. The object detector 100 may comprises at least one of a radar, a LiDar, and a camera.

The object detector 100 may generate object information on the basis of object detection signals. The object detector 100 may transmit object detection signals in the field of view (FOV) of the detector. The object detector 100 may receive object detection signals reflected from objects present in the FOV. The object detector 100 may generate object information by signal-processing the object detection signals received. Here, the object information may indicate information regarding the position of an object. The method of generating the object information by processing the received object detection signals by the object information generating system is a well-known technology in the art, and thus a detailed method thereof will be omitted.

Figure 2A:
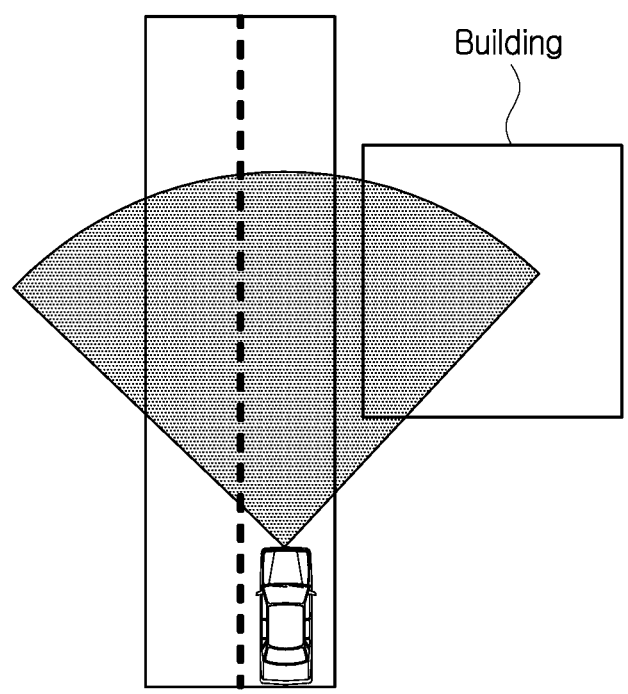
FIGS. 2A, 2B, 3A, 3B, 4A and 4B are example diagrams illustrating the object information generating system according to embodiments of the present disclosure.
Figure 2B:
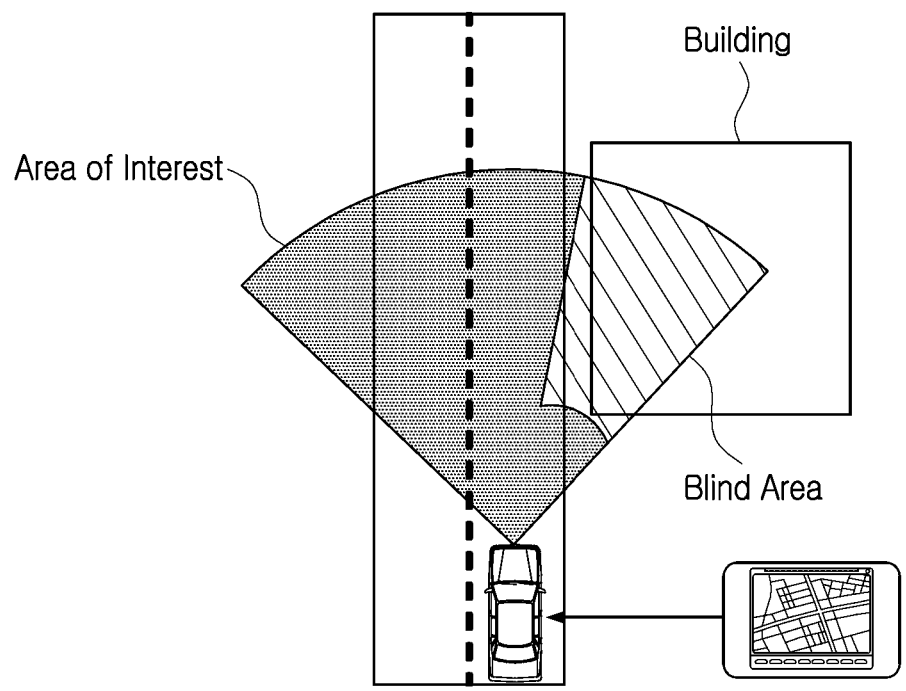
Figure 3A:
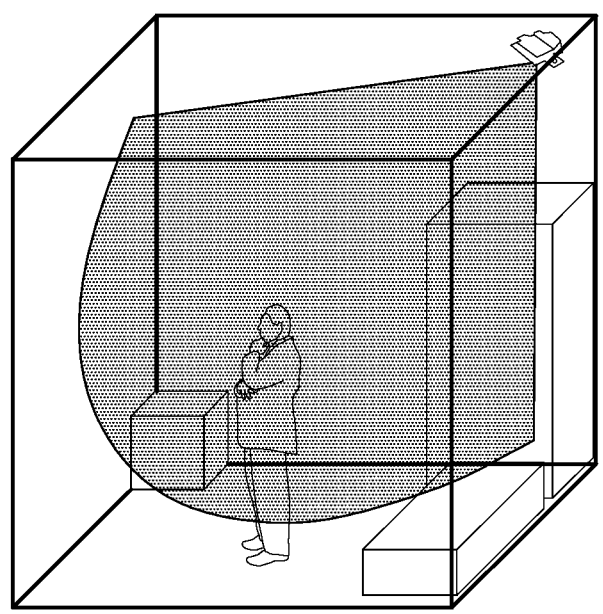
Figure 3B:
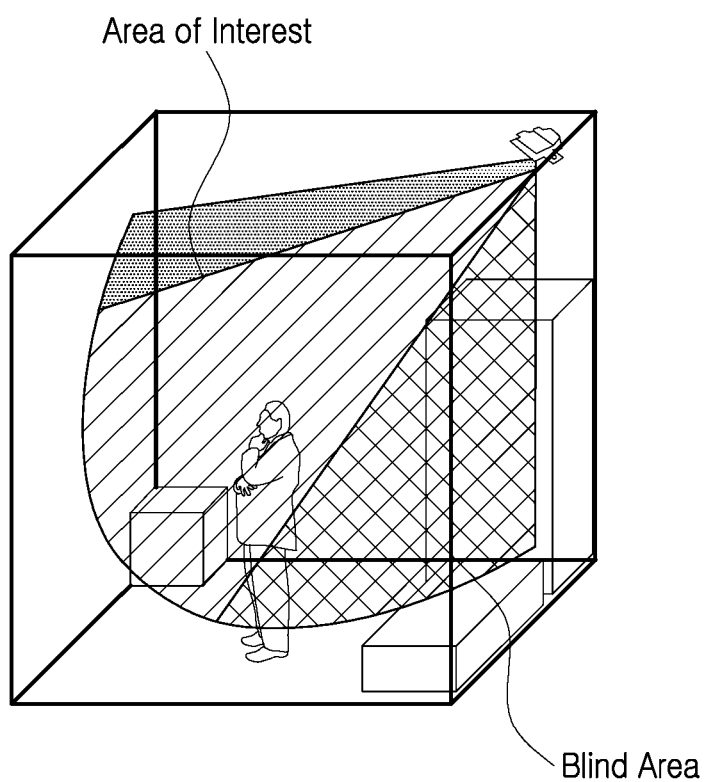

The input module 200 may receive environment information regarding surroundings thereof from the object detector 100. Here, the environment information may indicate position information regarding fixed objects positioned around the object detector 100. Each of the fixed objects is not an object intended to be detected with the object detector 100. Each of the fixed objects may indicate an object limiting detection. The fixed objects may be previously set in consideration of the purpose of the object detector 100 and the environment in which the object detector 100 is used. Referring to FIGS. 2A and 2B, in a situation in which the object detector 100 is used in a vehicle, buildings may be the fixed objects. Referring to FIGS. 3A and 3B, in a situation in which the object detector 100 is used indoors, pieces of furniture may be the fixed objects.

The input module 200 may receive the environment information from at least one of a camera, a sensor (e.g., an infrared (IR) sensor, an ultrasonic sensor, or a light detection and ranging (LiDAR) sensor), and a navigation device. Referring to FIGS. 2A and 2B, in a situation in which the object detector 100 is used in a vehicle, the input module 200 may use image information obtained using a camera provided in the vehicle as the environment information, use sensing information measured using a sensor provided in the vehicle as the environment information, or use geographic information regarding the surroundings of the vehicle stored in the navigation device provided in the vehicle as the environment information.

The processor 300 may determine an area of interest of the FOV, and generate the object information for the area of interest with the object detector 100. That is, the processor 300 may determine an area of the FOV to be the area of interest and generate the object information only for the area of interest with the object detector 100.

According to an embodiment, the processor 300 may identify a blind area caused by a fixed object and determine the remaining area of the FOV excepting the blind area to be the area of interest. Here, the blind area may indicate an area of the FOV in which object detection is limited by the fixed object (i.e., an area covered by the fixed object).

Figure 4A:
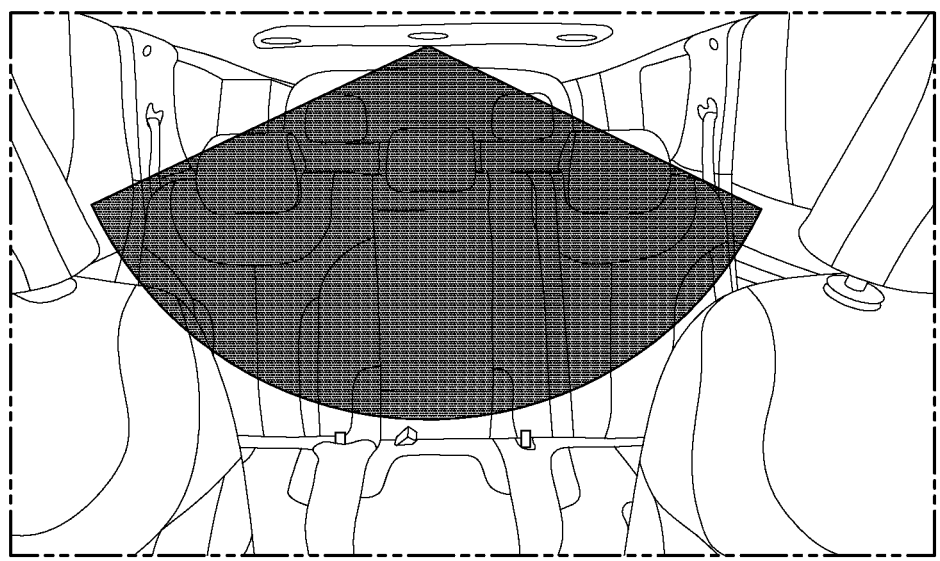
Figure 4B:
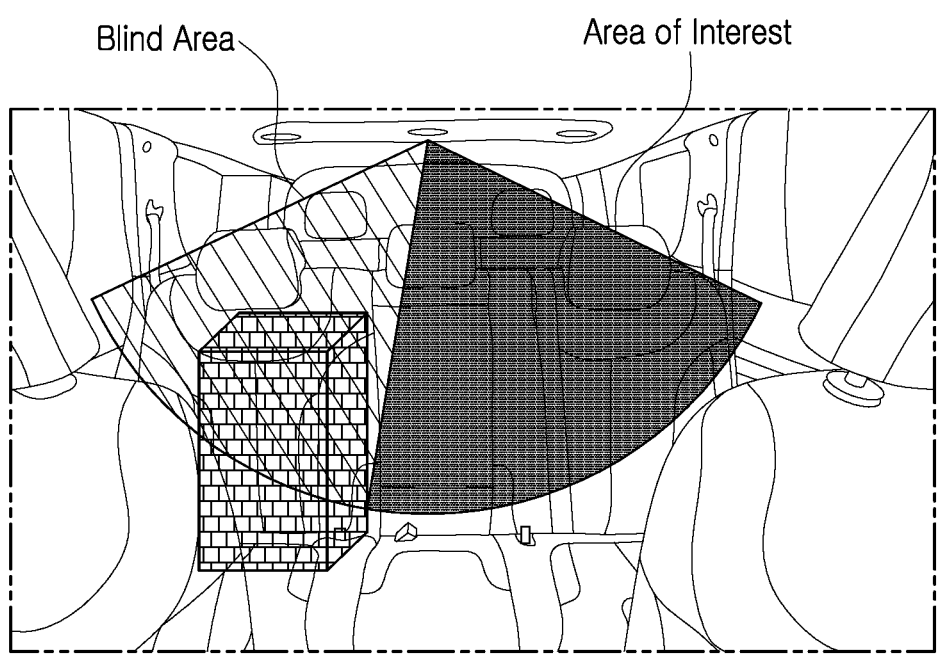

Referring to FIGS. 2A and 2B, an area covered by a building may be the blind area, and the remaining area of the FOV excepting the blind area covered by the building may be determined to be the area of interest. Referring to FIGS. 3A and 3B, an area covered by a piece of furniture positioned indoors may be the blind area, and the remaining area of the FOV excepting the blind area covered by the piece of furniture may be determined to be the area of interest. Referring to FIGS. 4A and 4B, an area covered by an object positioned inside a vehicle may be the blind area, and the remaining area of the FOV of the object detector 100 excepting the blind area covered by the object positioned inside the vehicle may be determined to be the area of interest.

According to an embodiment, the processor 300 may identify the blind area on the basis of the environment information input using the input module 200. That is, the processor 300 may identify the position, size, and shape of the fixed object present in the FOV of the object detector 100 on the basis of the environment information input using the input module 200, estimate an area in which detection is limited (i.e., an area that cannot be observed with the object detector 100) on the basis of the identified position, size, and shape of the fixed object, and identify the estimated area as the blind area.

According to another embodiment, the processor 300 may detect the fixed object present in the FOV with the object detector 100 and identify the blind area on the basis of the result of the detection. That is, the processor 300 may identify the position, size, and shape of the fixed object present in the FOV of the object detector 100 on the basis of the object detection signals received by the object detector 100, estimate an area in which object detection is limited on the basis of the identified position, size, and shape of the fixed object, and identify the estimated area as the blind area, instead of identifying the blind area on the basis of the environment information input using the input module 200.

According to an embodiment, the processor 300 may perform beam forming with the object detector 100 so that object detection signals are only emitted to the area of interest. That is, the processor 300 may emit the object detection signals only in a direction corresponding to the area of interest so that no object detection signals are emitted in any direction corresponding to any area excepting the area of interest, thereby ensuring the object detection is not performed for the area other than the area of interest.

According to another embodiment, the processor 300 may not perform signal processing for generating the object information for object detection signals corresponding to the area excepting the area of interest, so that only object information corresponding to the area of interest is generated. That is, the processor 300 may emit object detection signals in all directions corresponding to the FOV of the object detector 100 and only use object detection signals corresponding to the area of interest, excepting object detection signals corresponding to the area excepting the area of interest, in the signal processing, so that the object detection is not performed for the area excepting the area of interest.

As described above, the present disclosure can actively change the detection range of the object information generating system in response to the surrounding environment, thereby reducing the amount of data to be processed in the signal processing of object detection signals and reducing a calculation time consumed by the signal processing of object detection signals.

Figure 5:
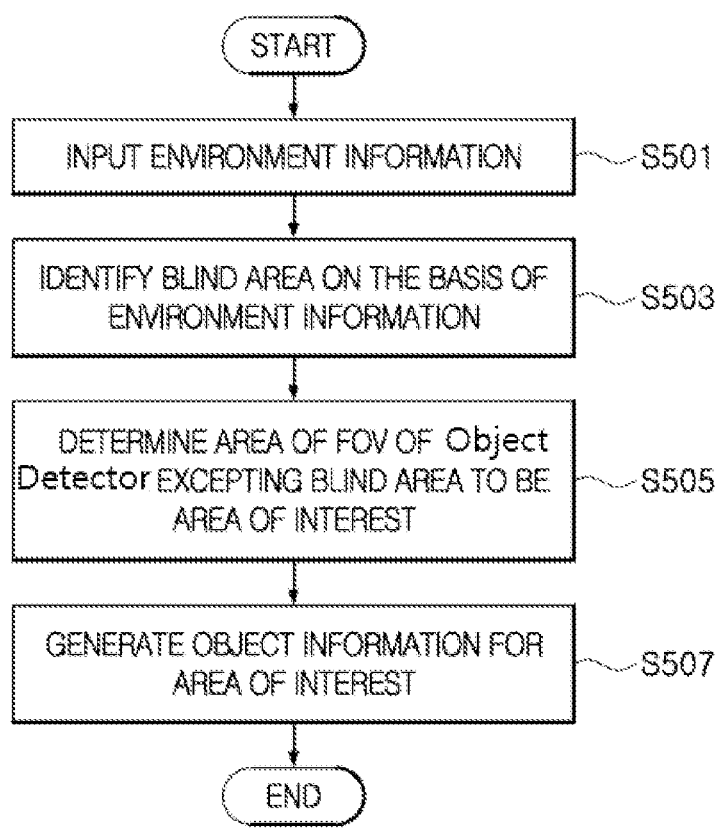
FIGS. 5 and 6 are flowcharts illustrating methods of operating the object information generating system according to embodiments of the present disclosure.

FIG. 5 is a first flowchart illustrating an operating method of an object information generating system according to an embodiment of the present disclosure.

Hereinafter, the first operating method of the object information generating system will be described with reference to FIG. 5.

First, in S501, the processor 300 may receive environment information regarding the surroundings of the object detector 100 using the input module 200. The processor 300 may receive the environment information from at least one of a camera, a sensor (e.g., an IR sensor, an ultrasonic sensor, or a LiDAR sensor), and a navigation device using the input module 200.

Afterwards, in S503, the processor 300 may identify a blind area on the basis of the environment information input using the input module 200. The processor 300 may identify the position, size, and shape of a fixed object present in the FOV of the object detector 100 on the basis of the environment information input using the input module 200, estimate an area in which object detection is limited (i.e., an area that cannot be observed with the object detector 100) on the basis of the identified position, size, and shape of the fixed object, and identify the estimated area as the blind area.

Subsequently, in S505, the processor 300 may determine the remaining area of the FOV of the object detector 100 excepting the blind area to be an area of interest.

Afterwards, in S507, the processor 300 may generate object information for the area of interest with the object detector 100. The processor 300 may generate the object information for the area of interest using a first method of only emitting object detection signals in a direction corresponding to the area of interest or a second method of not performing signal processing for generating the object information for object detection signals corresponding to the area excepting the area of interest.

Figure 6:
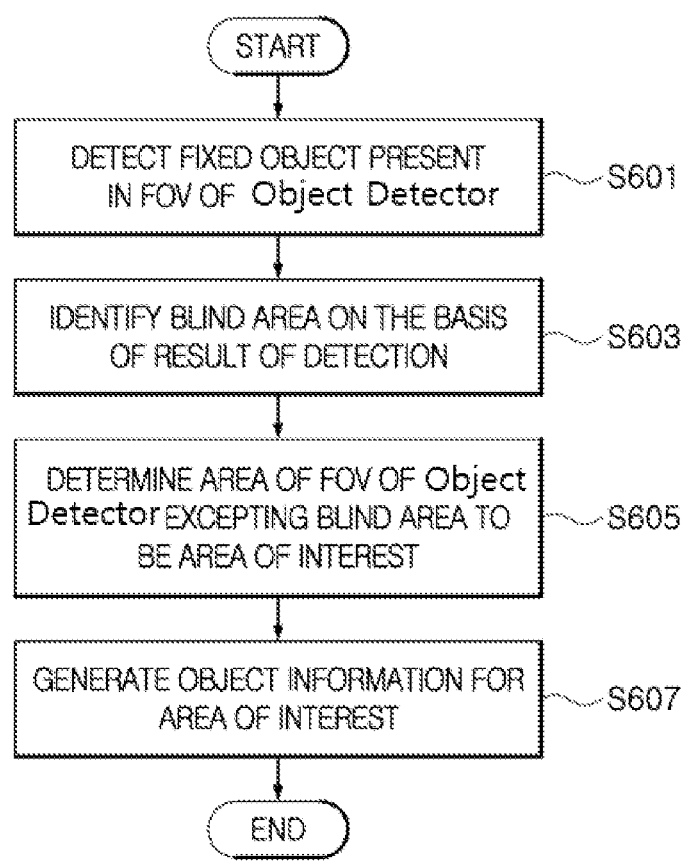

FIG. 6 is a second flowchart illustrating an operating method of an object information generating system according to an embodiment of the present disclosure.

Hereinafter, the second operating method of the object information generating system will be described with reference to FIG. 6.

First, in S601, the processor 300 may detect a fixed object present in the FOV of the object detector 100 with the object detector 100. The processor 300 may emit object detection signals in all directions from the object detector 100, receive object detection signals reflected from objects, and identify the position, size, and shape of the fixed object present in the FOV of the object detector 100 on the basis of received object detection signals.

Afterwards, in 603, the processor 300 may identify a blind area on the basis of the result of the detection. The processor 300 may estimate an area in which object detection is limited on the basis of the position, size, and shape of the fixed object present in the FOV of the object detector 100 and identify the estimated area as the blind area.

Subsequently, in S605, the processor 300 may determine the remaining area of the FOV of the object detector 100 excepting the blind area to be the area of interest.

Afterwards, in S607, the processor 300 may generate object information for the area of interest with the object detector 100. The processor 300 may generate the object information for the area of interest with the object detector 100 by a first method of only emitting object detection signals in a direction corresponding to the area of interest or a second method of not performing signal processing for generating the object information for object detection signals corresponding to the area excepting the area of interest.

As set forth above, the object information generating system and the operating method thereof according to embodiments of the present disclosure can actively change the detection range of the object information generating system in response to the surrounding environment, thereby reducing the amount of data to be processed during signal processing of object detection signals and reducing a calculation time consumed by the signal processing of object detection signals.

The term "module" used herein may refer to, for example, a unit comprised of hardware, software, and firmware. The module may be interchangeable with a term, such as "logic," "logical block," "component," "circuit," or the like. The module may be a unitary part or a minimum unit or a part of the unitary part for performing one or more functions. For example, the module may be implemented as an application-specific integrated circuit (ASIC).

The implementations described herein may be embodied as, for example, a method, a process, a device, a software program, a data stream, or signals. Even in the case in which the present disclosure has been discussed in the context of a single form of implementation (e.g., only discussed as a method), the discussed features may also be realized in another form (e.g., a device or a program). The device may be realized in a suitable form, such as hardware, software, or firmware. The method may be realized in a device, such as a processor, typically referred to as a processing device including, for example, a computer, a microprocessor, an integrated circuit, a programmable logic device, or the like. The processor may also include a computer, a cellular phone, a personal digital assistant (PDA), and other communication devices facilitating information communication between final users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An object information generating system comprising:
    an object detector configured to (1) transmit an object detection signal to a field of view FOV) area corresponding to a FOV of the object detector, and (2) generate object information based on the object detection signal transmitted to and reflected from an object present in the FOV area, the object information indicating a position of the object within the FOV area; and
    a processor configured to (1) determine an area of interest (AOI) within the FOV area and (2) control the object detector to generate the object information for the AOI,
    wherein, to determine the AOI within the FOV area, the processor is configured to identify, based on the object detection signal reflected from the object, a blind area occupied by a fixed object present in the FOV area, and determine a portion of the FOV area excluding the blind area to be the AOI, and
    wherein the controller is further configured to control the object detector to perform beam forming of the object detection signal such that that object detection signal is emitted from the object detector only to the determined AOI.

2. The object information generating system of claim 1, further comprising an input module configured to receive environment information regarding surroundings of the object detector,
    wherein the processor is configured to identify the blind area further based on the environment information.

3. The object information generating system of claim 1, wherein the processor is configured to detect the fixed object present in the FOV area and identify the blind area based on the detected fixed object.

4. The object information generating system of claim 1, wherein the object detector comprises at least one of a radar, a LiDar, and a camera.

5. A method of operating an object information generating system comprising an object detector, the method comprising:
    transmitting, from the object detector, an object detection signal to a field of view (FOV) area corresponding to a FOV of the object detector;
    generating object information based on the object detection signal transmitted to and reflected from an object presented in the FOV area, the object information indicating a position of the object within the FOV area;
    determining, based on the object detection signal, an area of interest (AOI) within the FOV area; and
    control the object detector to generate the object information for the AOI,
    wherein determining the AOI comprises:
        identifying, based on the object detection signal reflected from the object, a blind area occupied by a fixed object present in the FOV area, and
        determine a portion of the FOV area excluding the blind area to be the AOI, and
    wherein the method further comprises controlling the object detector to perform beam forming of the object detection signal such that that object detection signal is emitted from the object detector only to the determined AOI.

6. The method of claim 5, further comprising receiving environment information regarding surroundings of the object detector,
    wherein the blind area is identified based on the received environment information.

7. The method of claim 5, wherein identifying the blind area comprises:
    detecting, based on the object information, the fixed object present in the FOV area; and
    identifying the blind area based on the detected fixed object.

8. The method of claim 5, wherein the object detector comprises at least one of a radar, a LiDar, and a camera.

* * * * *